United States Patent [19]

Ruf

[11] 4,101,480

[45] Jul. 18, 1978

[54] PIGMENTARY PRINTING PASTE ADDITIVE

[75] Inventor: Roland Ruf, Chantilly, France

[73] Assignee: Produits Chimiques Ugine Kuhlmann, Paris, France

[21] Appl. No.: 636,271

[22] Filed: Nov. 28, 1975

[30] Foreign Application Priority Data

Nov. 15, 1974 [FR] France ................. 74 37651

[51] Int. Cl.$^2$ ............... C09D 5/02; C09D 11/02; C09D 11/10
[52] U.S. Cl. .................. 260/23 AR; 8/62; 106/20; 106/27; 106/28; 260/29.6 TA; 260/29.7 T; 260/42.21; 260/42.55; 260/DIG. 38
[58] Field of Search ............. 260/DIG. 38, 23 AR, 260/29.6 TA, 42.21, 42.55, 29.7 T; 8/62; 106/20, 27, 28

[56] References Cited

U.S. PATENT DOCUMENTS

| | | | |
|---|---|---|---|
| 2,719,831 | 10/1955 | Craemer et al. | 260/29.4 UA |
| 2,991,260 | 7/1961 | Auer et al. | 260/29.4 UA |
| 3,002,939 | 10/1961 | Balassa | 260/29.4 UA |
| 3,258,443 | 6/1966 | Cantor et al. | 260/29.6 TA |
| 3,296,169 | 1/1967 | Corey | 260/29.6 TA |
| 3,484,420 | 12/1969 | Chihara | 260/29.6 TA |
| 3,770,680 | 11/1973 | Iacoviello | 260/29.6 TA |
| 3,825,431 | 7/1974 | Uhl et al. | 106/20 |
| 3,844,994 | 10/1974 | Vijayendran | 260/22 R |
| 3,861,869 | 1/1975 | Schwindt et al. | 8/62 |
| 3,903,034 | 9/1975 | Zabiak et al. | 260/29.6 WB |
| 3,978,016 | 8/1976 | Perronin et al. | 260/29.6 TA |

FOREIGN PATENT DOCUMENTS

| | | | |
|---|---|---|---|
| 1,556,659 | 12/1968 | France | 8/62 |
| 7,315,341 | 11/1974 | France | 8/62 |
| 38-24797 | 11/1963 | Japan | 8/62 |
| 1,209,241 | 10/1970 | United Kingdom | 8/62 |

Primary Examiner—Ronald W. Griffin
Attorney, Agent, or Firm—Beveridge, Degrandi, Kline & Lunsford

[57] ABSTRACT

Liquid additive, which is substantially insoluble in water, for a pigmentary printing paste for use in printing on textile fibers and fabrics, wherein the additive comprises a surface-active, non-ionic liquid product having a molecular weight of between 1,000 and 20,000 and formed by condensing one or more alkylene oxides, and preferably propylene oxide, with a compound having one or more atoms of active hydrogen. The pigmentary printing paste is in the form of an emulsion or semi-emulsion of the oil-in-water type and contains a synthetic thickening agent which is soluble in water with a rate of at least 20% of dry material and which is swollen by alkaline agents. The thickening agent is formed by the copolymerization of at least 20% of one or more unsaturated carboxylic acids having 3 to 4 carbon atoms and, if need be, with one or more other unsaturated monomers. The printing paste also contains the finely dispersed pigment, the binding agent, which is a copolymer of unsaturated monomers, and an emulsifying agent plus the other conventional ingredients used in such pastes.

30 Claims, No Drawings

PIGMENTARY PRINTING PASTE ADDITIVE

This application is a continuation-in-part of my application Ser. No. 632,893 filed Nov. 17, 1975, now abandoned.

The invention relates to an additive for a pigmentary printing paste on textile fibres.

It is known to print oil-in-water emulsions of resins on textile fibres. These emulsions contain high quantities of water-insoluble hydrocarbons, possibly amounting to 70% or even more. A typical example of these hydrocarbons is white spirit.

The disadvantage with these solvent hydrocarbons is that they pollute the atmosphere because they are practically released into the atmosphere whilst the printed fabric is drying or during thermofixing. The use of the solvents also causes the pollution of water whilst the printed material is being cleaned and rinsed. In addition, there is a risk of an explosion and precautions need to be taken, therefore, to ventilate plants so as to avoid the accumulation of dangerous fumes.

According to U.S. Pat. No. 3,976,106 dated Aug. 31, 1976 it is possible to avoid, partially or totally, the use of water-insoluble solvents in the composition of the pigmentary printing pastes. According to this prior art, synthetic thickening agents based on water-soluble copolymers are used.

By using aqueous printing pastes which do not contain hydrocarbons, it is found, however, that, despite its high viscosity, the printing paste tends to penetrate the textile carrier, and this constitutes an undesirable phenomenon. In addition, the printing paste thus constituted exhibits in most cases an unfavourable susceptibility to crushing. This phenomenon which is particularly obvious in roller printing is also apparent in rotary-frame printing under the pressure of the scraper.

These phenomena generally lead to a marked drop in the colour yield and often also a diminution in the brightness of the pigment deposited on the fabric.

One surprising fact that we have discovered is that is is possible — according to the present invention — both to avoid the problems associated with the use of hydrocarbons and at the same time to obtain pigmentary prints having a colour yield and a brightness of the same order — possibly better — than those obtained by using hydrocarbons, to print with pastes whose viscosity is not very high or often is even lower than used in current practice, and to avoid the pollution of the air and water. In most cases, the invention also permits better levelness to be obtained than with prior techniques, with fastness qualities of the same order as those according to known processes, by using a new additive in a relatively very weak amount.

The percentages and parts referred to hereinafter are expressed by weight.

According to the present invention a liquid additive for a pigmentary printing paste on textile fibres is provided which is practically insoluble in water, said additive comprising a non-ionic, surface-active liquid product which is practically insoluble in water with a molecular weight of from 1000 to 20000 resulting from condensing at least one alkylene oxide with a compound having at least one atom of active hydrogen, said pigmentary printing paste being in the form of an emulsion or semi-emulsion of the oil-in-water type containing a synthetic thickening agent which is soluble in water and comprises at least 20% of dry material and which is swollen by alkaline agents, said thickening agent resulting from the polymerisation or copolymerisation of at least 20% of at least one unsaturated carboxylic acid or anhydrous having 3 or 4 carbon atoms and also containing finely dispersed pigment and binding agent in the form of a copolymer of unsaturated monomers. The thickening agent may also contain at least one other unsaturated monomer and the paste may contain other conventional ingredients.

By the expression "practically insoluble in water" we mean a water-solubility of less than 2% at ambient temperature. The liquid products of this invention have a melting point below 40° C. By the expression "semi-emulsion" we mean an oil-in-water emulsion containing a "low" proportion of oily phase. The oily phase comprises a water-insoluble hydrocarbon and the "low" proportion corresponds to 150–400 g. of hydrocarbon per 1,000 g. of semi-emulsion, whereas a normal proportion corresponds to 650–700 g. of hydrocarbon phase in 1,000 g. of emulsion.

The preferred alkylene oxide is propylene oxide which may be present on its own or as the greater proportion compared with any other alkylene oxide used, generally ethylene oxide. The higher homologues of propylene oxide, such as butylene oxide, may also be used.

The compounds having at least one atom of active hydrogen may be for example monoalcohols such as methanol, ethanol, propanols, butanols, and homologues having less than 20 carbon atoms, these alcohols can be oxo alcohols, polyalcohols such as glycol, glycerol, pentaerythritol, and oses having 5 to 12 carbon atoms such as sorbitol or saccharose; aliphatic monoacids having 12 to 40 carbon atoms, such as fatty acids; aliphatic polyacids having 1 to 20 carbon atoms, as well as their esters or ethers; aliphatic mono- or polyamines preferably having 1 to 6 carbon atoms and the polyamines having at most 4 amine functions such as ethylenediamine, diethylene diamine or diethylene tetramine; aminoalcohols such as mono-, di- or triethanol-, propanol- or butanolamine; or water.

Condensation may be uniform, for example, with propylene oxide used on its own. The patterns of alkylene oxide may be distributed at random, for example using a mixture of propylene oxide and ethylene oxide. They may also be distributed in sequence, for example with successive and separate use of propylene oxide and ethylene oxide.

According to one particular form of the invention, the surface-active product results from the condensation of propylene oxide and n-butanol and has a molecular weight of from 1000 to 5000.

The surface-active product may also result, for example, from the condensation of propylene oxide containing 0% to 20% more particularly 10%, of ethylene oxide with propylene glycol.

According to one advantageous embodiment of the invention, the additive comprises in addition to the surface-active product a water-insoluble liquid compound having a fatty character carrying at least one aliphatic radical with at least 8 carbon atoms, and/or a hydrophobic solvent with a boiling point of from 100° to 250° C. in the ratio of between 10 and 30 parts of solvent to 100 parts of additive.

The compound having a fatty character, which is also referred to as a softening agent, preferably comprises 1 to 3 aliphatic radicals which generally do not carry more than 30 carbon atoms. Its boiling point is generally above 180° C. The softening agent may be for example a glyceride such as castor oil or olein, a saturated or unsaturated hydrocarbon with a long linear or branched chain, such as paraffin oil, an aliphatic alcohol such as octyl alcohol or its homologues, a fatty acid such as octanoic acid or its homologues or their derivatives such as esters or salts. The softening agent is preferably castor oil, olein or paraffin oil.

The additive may comprise said softening agent and/or comprise as the hydrophobic solvent a saturated aliphatic hydrocarbon or a mixture of saturated aliphatic hydrocarbons with a boiling point of from 140° to 200° C. containing less than 5% of aromatic hydrocarbons.

The incorporation of the hydrophobic solvent in the additive is essentially to regulate the viscosity of the latter conveniently for practical purposes. According to one embodiment of the invention, 20% to 50%, and preferably 30% to 40%, of the weight of the additive is made up of softening agent.

In practice, the additive is incorporated in the printing paste at the rate of 1% to 10% of the weight of the latter, and preferably 2% to 6%.

Within the scope of the invention, the content of hydrophobic solvent in the printing paste, because of the incorporation of the additive, is from 0% to 3% of the weight of the paste and does not exceed 1% in most cases. With such small proportions, the above-mentioned problems caused by using solvents wholly disappear in practice.

The additive is generally emulsified with the help of an emulsifying agent which may be, for example, a well-known agent such as the condensation product of a $C_{13}$–$C_{15}$ oxo-alcohol with 6 to 40 molecules of ethylene oxide, or oxyethylenated stearyl or oleyl alcohol. The emulsion may be prepared by a known method for example with the help of a 3000 r.p.m. turbo agitator.

One essential feature of the synthetic thickening agent of the present invention is its swelling in the presence of an alkaline agent such as an amine having a strongly alkaline character or preferably ammonia. The amine may be, for example, an aliphatic amine or aminoalcohol having 2 to 8 carbon atoms such as mono-, di- or tri-ethanolamine, diethylaminoethanol, guanidine or a mixture thereof. The viscosity achieved in the printing paste following this alkaline treatment is generally from 5 to 100 poises, the measurement being effected with the apparatus called "Rheomat 30" (Establissment Contraves of Switzerland, with spindle "B" and tank "B" of this apparatus) at the temperature of 25° C., for a spindle speed of the order of 9 revolutions per minute. At a speed of 350 r.p.m. the viscosity is 0.5 to 10 poises.

The synthetic thickening agent offers a rate of dry matter which can, if need be, exceed 90% and may therefore be in pulverulent form, but in most cases it is in the form of a latex. It is polymerised or copolymerized from acid monomers which may be dicarboxylic acids such as maleic acid or anhydride but which are more particularly acrylic or methacrylic acid or maleic anhydride. The copolymerisation referred to above can be effected starting with one or more other unsaturated monomers which may be for example, unsaturated hydrocarbons preferably having 2 to 5 carbom atoms or unsaturated acids such as acrylic or methacrylic acid or an alkyl ester thereof in which the alkyl radical has 1 to 5 carbon atoms.

According to one preferred embodiment of the invention, the synthetic thickening agent is a latex of a water-soluble copolymer whose vitreous transition temperature is from 20° to 100° C, preferably 50° to 100° C., obtained by polymerizing the following elements to form an emulsion:

(a) 40% to 60% by weight of acrylic, methacrylic and/or crotonic acid.

(b) 10% to 30% by weight of a vinyl ester of an organic or mineral acid, (c) 50% to 30% by weight of at least one ethylene monomer, other than the aforesaid esters, forming a water-insoluble homopolymer, (d) 0% to 5% by weight of at least one monomer having an ethylene bond and polar groups, (e) 0% to 5% by weight of at least one monomer having several ethylene bonds, said latex having a rate of dry matter from 30% to 50%, preferably from 35% to 45%, and a pH from 2 to 5.

According to another advantageous embodiment of the invention, the thickening agent is a copolymer of ethylene and maleic anhydride.

The invention also relates to an additive as defined above, incorporated in the printing paste which contains 0.5% to 15%, preferably 1% to 8% by weight of synthetic thickening agent.

Of the other conventional ingredients for pigmentary printing pastes, the most common one is the fixing agent, generally of the cyclic or non-cyclic urea-formaldehyde type, for increasing the fastness to washing of the pigmented fabric, and various adjuvants. Among the latter one may mention, for example, anti-foaming agents and agents improving the handle of the printed designs, based on silicone, the one and the other in proportion not exceeding 1%. The resin which fixes the pigment on the textile fibre is referred to as a binding agent. The binding agent may be based for example on acrylic resin or butadiene. The textile fibre may be for example cellulosic, animal, artificial or synthetic, on its own or in a mixture, and may constitute the woven or non-woven fabric substrate for the pigmentary printing.

The invention includes a process for using the new additive, wherein an emulsion of the additive is effected in water rendered alkaline, preferably in the presence of an emulsifying agent, then the thickening agent is incorporated in the emulsion and subsequently the other constituents of the printing paste are added; and pigmentary printing pastes made by this process.

According to an embodiment of the invention which is particularly convenient from the point of view of use one can prepare a mixture M which is almost anhydrous and ready for use which comprises the liquid additive, anhydrous synthetic thickening agent, anhydrous or almost anhydrous emulsifying agent and the anhydrous agent improving the handle and alkaline agents in anhydrous form or in the form of very concentrated aqueous solution. This embodiment facilitates the transport of the above ingredients combining them in a single mixture which is more convenient than the separate ingredients and less weighty by reason of its almost anhydrous character and facilitates also the use of the said ingredients which may be effected by a single weighing instead of multiple weighings of the separate ingredients.

In accordance with the invention a product which is substantially anhydrous contains at most 10% and preferably less than 3%, of water.

The mixture M is diluted with water with mechanical agitation, then one adds also with mechanical agitation the binding agent, the pigment and any other ingredients. One thus obtains a pigmentary printing paste which gives results on textile fibres which are practically equivalent to those obtained with a paste obtained using the novel additive and the other ingredients added separately.

The invention also relates to pigmentary printing pastes which are obtained by using the new additive.

The invention is illustrated by the following Examples in which the parts are by weight.

EXAMPLE 1 (comparative realizations)

A hydrophilic bleached cotton fabric with a mesh structure is printed by means of an 80-mesh rotary frame, with a printing paste $A_1$ according to the invention corresponding to the following composition:

The additive according to the invention results from mixing 3 parts of oxypropylenated n-butanol, having a molecular weight of from 3000 to 4000, and 2 parts of castor oil diluted with 1 part of white spirit. This additive is poured into 63.9 parts of water at a temperature of approximately 20° C. 1 part of an emulsifying agent, constituted by a 33% aqueous solution of the condensation product of one mole of oleic alcohol and 25 moles of ethylene oxide, and 2 parts of 22°Be ammonia, plus 0.1 part of the silicone based antiforming agent which is effective in the aqueous phase sold as Silicone "Rhodorsil" antifoaming agent 414 by Rhonê-Poulenc are subsequently added.

The whole mixture is stirred vigorously by means of a turbo-agitator, then 5 parts of a latex having 35% of dry matter, as described in Example 1 of U.K. patent application No. 18267/74 (thickening agent), is poured in with stirring.

15 parts are then added of a binding agent based on acrylic resin comprising a latex having 40% of a copolymer prepared from:
- 66.6% of butyl acrylate
- 24.5% of acrylonitrile
- 2% of acrylic acid
- 3% of glycol monomethacrylate
- 2% of glycol dimethacrylate
- 2% of methylol acrylamide and 2 parts of a fixing agent comprising 65% hexamethoxymethylmelamine are added. 2 parts of a phthalocyanine blue pigment Colour Index No. 74,160, in a 50% dispersed aqueous paste are added to the paste thus obtained.

The printing paste $A_1$ therefore contains 6% of the additive according to the invention.

The paste $A_1$ is printed by means of a rotary frame, dried, then subsequently heat set at 170° C. for 5 minutes.

A printing paste $B_1$ which is rich in hydrocarbons according to prior art and thickened with an oil-in-water emulsion is prepared according to the following particulars:

| | |
|---|---|
| Binding agent based on acrylic resin in accordance with that used for $A_1$ | 15 parts |
| Water | 5 parts |
| Emulsifying agent in accordance with that used for $A_1$ | 2 parts |
| Urea (as an anti-drying agent) | 3 parts |
| Fixing agent in accordance with that used for $A_1$ | 2 parts |
| White spirit (q.s. for 100 parts) | 69 parts |
| Ammonium phosphate in 33% aqueous solution (as a catalyst) | 2 parts |
| Pigment in accordance with that used for $A_1$ | 2 parts |
| Total | 100 parts |

Moreover, by not using the additive according to the invention, a printing paste $C_1$ has been prepared as follows, in conformity with U.K. patent application No. 18267/74.

| | |
|---|---|
| Water (q.s. for 100 parts) | 73.9 parts |
| Anti-foaming agent in accordance with that used for $A_1$ | 0.1 part |
| 22° Be ammonia | 2 parts |
| Thickening agent according to Example 1 of U.K. Patent Application No. 18267/74, in accordance with that used for $A_1$ | 5 parts |
| Binding agent in accordance with that used for $A_1$ | 15 parts |
| Fixing agent in accordance with that used for $A_1$ | 2 parts |
| Pigment in accordance with that used for $A_1$ | 2 parts |
| Total | 100 parts |

The pastes $A_1$, $B_1$ and $C_1$ have been prepared, printed, then dried and heat set, in a manner which was strictly comparative one with the other, on the same quality of fabric and with the same equipment.

The results are as follows:

The pastes $A_1$ according to the invention (having merely 1% of white spirit) and $B_1$ according to prior art (having 69% of white spirit) produce very strong blue printed patterns with remarkable brightness, which are practically identical to each other.

Paste $C_1$ produces less strong and less bright patterns.

The same printing operations were also effected with the same pastes $A_1$, $B_1$ and $C_1$ on a different quality of cotton fabric (cotton satinette) with the same results as on mesh cotton fabric.

COMPARATIVE EXAMPLES 2 TO 6

One operates substantially as in Example 1 but the following modifications are introduced therein:

Pastes $A_2$ to $A_6$ according to the invention are prepared and applied in comparison to pastes $B_2$ to $B_6$ (rich in white spirit) and $C_2$ to $C_6$, respectively. The indices 2 to 6 refer to Examples 2 to 6.

In each of Examples 1 to 6, a different pigment is used. In each Example, the same pigment is used in the same proportion for the pastes of type A as well as types B and C. (The pastes $A_1$ to $A_6$, $B_1$ to $B_6$ and $C_1$ to $C_6$ are called type A, B and C respectively).

The pastes $B_2$ to $B_5$ and $C_2$ to $C_5$ differ from the pastes $B_1$ and $C_1$ respectively only by the nature of the pigment. The pastes $B_6$ and $C_6$ also differ therefrom by the quantity of pigment and correlatively by the gross weight needed (quantities of hydrophobic solvent for $B_6$ or of water for $C_6$ sufficient to make the weight of paste up to 100 parts).

EXAMPLE 2

$A_2$ differs from $A_1$ in respect of the following points:
- The surface-active product of $A_2$ is the same as for $A_1$, except with regard to its molecular weight which is from 1900 to 2000.
- The additive does not comprise any hydrophobic solvent and therefore comprises 3 parts of the surface-active product and 2 parts of castor oil, making a total of 5 parts of additive according to the invention to 100 parts of printing paste.

- The pigment is a mineral pigment based on ferric oxide, Colour Index No. 77,491 (50% dispersed aqueous paste).
- The weight of water added to constitute $A_2$ (q.s. for 100 parts) is 67.9 parts.

Printing is effected with a flat frame on hydrophilic cotton satinette fabric, and on mesh cotton fabric.

The printed patterns obtained in a strong reddish-brown shade have good brightness and good levelness, and are entirely comparable with each other for the pastes $A_2$ and $B_2$, though the patterns are paler and duller for $C_2$.

EXAMPLE 3

$A_3$ differs from $A_1$ by the softening agent, which is paraffin oil, and by the pigment, which is a red organic azo pigment Colour Index No. 12 490 in a 50% dispersed aqueous paste.

The 2 fabrics subjected to the treatments are bleached and hydrophilic, formed from polyester-cotton and mesh cotton, respectively.

The printing processes take place on a flat frame.

On both fabrics, $A_3$ and $B_3$ produce printed patterns in a strong bluish-red shade, with good brightness, which are entirely comparable with each other, whereas $C_3$ gives a paler and duller shade.

EXAMPLE 4

$A_4$ differs from $A_1$ in respect of the following points:
the surface-active product is the same as for $A_1$ except with regard to the molecular weight which is 2500–3000.
No hydrophobic solvent is used.
The softening agent is paraffin oil.
No anti-foaming agent is used.
The synthetic thickening agent is ammonium methacrylate having 90% of dry extract, which is used at the rate of 1 part.
The red organic azo pigment Colour Index No. 12,370 is used (in 50% dispersed aqueous paste).
The quantity of water used is 72.0 parts (necessary for the gross weight).
5 parts of the additive according to the invention to 100 parts of paste are therefore used.
The 2 fabrics subjected to the treatments are bleached hydrophilic cotton satinette and mesh cotton fabrics.
The process is effected on a flat frame.

Strong bright red patterns with good brightness are obtained which are entirely comparable for $A_4$ and $B_4$, but are slightly paler and duller for $C_4$.

EXAMPLE 5

$A_5$ differs from $A_1$ in respect of the following points:
Absence of any hydrophobic solvent.
A yellow organic azo pigment is used corresponding to Colour Index No. 21 095 (50% dispersed aqueous paste).
The quantity of water used is 69.9 parts (because of the gross weight needed).
3 parts of the additive according to the invention are therefore used in 100 parts of paste.
The bleached hydrophilic fabric subjected to the treatments is a cotton satinette.
Printing is effected on a rotary frame.

Printed patterns in a strong yellow shade with good brightness are obtained which are entirely comparable with each other for $A_5$ and $B_5$, but are slightly paler and duller for $C_5$.

EXAMPLE 6

$A_6$ differs from $A_1$ in respect of the following points:
Absence of any softening agent.
Absense of any hydrophobic solvent.
The surface-active product is the same as for $A_1$, with the exception of the molecular weight which is 2500–3000.
A chlorinated green phthalocyanine pigment is used which corresponds to Colour Index No. 74 260 (50% dispersed aqueous paste).
The quantity of pigment added is 5 parts (instead of 2 parts for Examples 1 to 5).
As already mentioned, for $B_6$ and $C_6$ the gross weight requirements lead to changes in the quantity of white spirit for $B_6$ (66.0 parts) and in the quantity of water for $C_6$ (70.9 parts).
The fabric subjected to the treatments is a desized triacetate.
Roller printing is effected with an engraving having hatchings of 10 hundredths of a mm.
For $A_6$, very strong green patterns with remarkable brightness are obtained which are slightly superior to $B_6$ in respect of strength and brightness and are superior to $B_6$ in respect of levelness. $C_6$ gives poorer results.

EXAMPLES 7 TO 12 (ACCORDING TO THE INVENTION)

Printing pastes $A_7$ to $A_{12}$ are prepared which are substantially in conformity with pastes $A_1$ to $A_6$, respectively, but with the following modification:

The surface-active product is the condensation product of propylene glycol with propylene oxide and ethylene oxide, the latter being present in a proportion of 10% of all the alkylene oxides and the molecular weight of the surface-active product being from 1800 to 2000.

The pastes $A_7$ to $A_{12}$ are printed on the same fabrics and with the same printing equipment as pastes $A_1$ to $A_6$, respectively.

The results obtained with pastes $A_7$ to $A_{12}$ are close to those realized with $A_1$ to $A_6$, respectively.

EXAMPLE 13 (COMPARATIVE EMBODIMENTS)

A printing paste $A_{13}$ according to the invention is prepared using the method of operation as described above for paste $A_1$ of Example 1, in which the additive is replaced by another additive according to the invention. The latter comprises a mixture of 3 parts of oxypropylenated $C_{13}$–$C_{15}$ oxo alcohol with a molecular weight of between 1000 and 1500, and 1 part of castor oil. The additive is poured into 65.9 parts of water. The remainder of the preparation is identical to that for paste $A_1$.

The pastes $A_{13}$, $B_1$ and $C_1$ have been obtained, printed, then dried and heat set in such a manner that they are strictly comparable one with the other, on the same quality of fabric and with the same material.

The results of paste $A_{13}$ are analogous to those of paste $A_1$, $A_{13}$ performing in a manner which is substantially identical to $B_1$ although $A_{13}$ is totally free of white spirit. $A_{13}$ gives more intense and brighter patterns than $C_1$.

EXAMPLE 14 (comparative embodiments)

The method of obtaining printing paste $A_{14}$, is the same as that for paste $A_{13}$ except with regard to the new additive which comprises solely 3 parts of oxypropylenated castor oil with a molecular weight of between 2,000 and 3,000. The additive is introduced into 66.9 parts of water and the pigment is that of Example 2. Apart from these differences, the preparation is identical to that for paste $A_{13}$ or $A_1$.

The paste $A_{14}$ has been compared with pastes $B_2$ and $C_2$. The results of $A_{14}$ are substantially identical to those of $B_2$ and superior to those of $C_2$ in respect of intensity and brightness.

EXAMPLE 15 (comparative)

Preparation of paste $A_{15}$ according to the invention. The new additive is formed from 2 parts of a complex ester of dimeric acid of oleic acid and lauric acid on oxypropylenated dimethylol propane with a molecular weight of approximately 15,000, 1 part of castor oil and 1 part of white spirit. The additive is poured into 65.9 parts of water, and the pigment is that of Example 3. Apart from these differences (relating to the constitution of the new additive, the number of parts of water, and the choice of pigment), the preparation of paste $A_{15}$ is identical to that of paste $A_{13}$ or $A_1$.

The paste $A_{15}$ has been compared with pastes $B_3$ and $C_3$. The results of $A_{15}$ proved to be substantially identical to those of $B_3$, and superior to $C_3$ in respect of intensity and brightness.

EXAMPLE 16

Results are obtained which are very analogous to those of paste $A_{15}$ using a paste $A_{16}$ in which the additive of $A_{15}$ is replaced by a new additive formed as follows: 2 parts of polymeric ester resulting from the reaction between 3 molecules of dimeric acid of oleic acid and 2 molecules of 2,2'-dimethylpropane-1,3-diol and 2 molecules of $C_{13}$-$C_{15}$ oxo alcohol on propylene oxide with a molecular weight of the order of 12,000 designated by the mark "Emkarox E 1500", 1 part of castor oil and 1 part of white spirit.

EXAMPLE 17 (comparative example)

A bleached and hydrophilic cotton fabric with a mesh structure is printed by means of a rotary frame of 80 mesh with a printing paste $A_{17}$ according to the invention.

The paste $A_{17}$ is prepared as follows:

An almost anhydrous mixture M as defined above which is ready for use in taken. In this mixture, the liquid additive is the same as that of paste $A_1$ described in Example 1, the anhydrous synthetic thickener is an ethylene/maleic anhydride copolymer, the anhydrous emulsifier is the condensation product of $C_{13}$-$C_{15}$ oxo alcohol with 20 molecules of ethylene oxide, the anhydrous agent which improves the handle is a silicone oil which is sold under the registered Trade Mark "Huile Rhodorsil 47 V 5000", the alkaline agent is formed from an aqueous solution of highly concentrated 30% $NH_3$ ammonia, and 99% diethylamino ethanol. The liquid additive represents 50% by weight of the mixture, the synthetic thickener 20%, the emulsifier 5%, the handle improving agent 10% and the alkaline agents 15% by weight of the mixture, a third thereof being the ammoniacal solution and two thirds being the amine.

5 parts of the mixture M are diluted with stirring with 74 parts of water, then 15 parts of the same binder and 2 parts of the same fixer as those of paste $A_1$ in Example 1 and 2 parts of the same pigment as that of paste $A_4$ in Example 4 are added.

The paste $A_{17}$ thus obtained is printed on a rotary frame, dried and then heat set.

The paste $A_{17}$ has been compared with paste $B_4$ of Example 4. The results are as follows: The paste $A_{17}$ according to the invention and $B_4$ which is rich in white spirit according to prior art give very intense red printed patterns which are remarkably bright and are practically identical to each other.

EXAMPLE 18

The facts given for Example 17 are repeated with the introduction of the following variants:

An almost anhydrous mixture M which is ready for use and differs from the mixture M of Example 17 by the constitution of the additive is taken: this additive is the same as that in Example 14.

The mixture M is then used in the same conditions as the mixture M in Example 17, except with regard to the pigment which is that of Example 5.

The paste $A_{18}$ thus obtained, according to the invention, and the paste $B_5$ of Example 5, which contains a high quantity of white spirit, give yellow printed patterns which have a high yield and are practically identical to each other.

What we claim is:

1. In a pigmentary printing paste for textile fibers wherein said paste is in the form of an oil-in-water emulsion or semi-emulsion containing a water-soluble synthetic thickening agent which comprises at least 20% of dry material and which is swollen in an aqueous medium by alkaline agents and which results from the polymerization or copolymerization of at least 20% of at least one unsaturated carboxylic acid having 3 or 4 carbon atoms or an anhydride thereof, wherein said paste also contains finely dispersed pigment, binding agent in the form of a copolymer of unsaturated monomers, and an emulsifying agent; the improvement whereby said printing paste contains from 1 to 10% by weight of a liquid additive which is substantially insoluble in water, said additive comprising a nonionic surface-active liquid product which is substantially insoluble in water, and which has a molecular weight of from 1,000 to 20,000 and is the condensation product of propylene oxide or of a mixture of propylene oxide and ethylene oxide containing a greater amount of propylene oxide with a compound having at least one atom of active hydrogen which is selected from the group consisting of monoalcohols comprising methanol, ethanol, propanols, butanols and homologues thereof having less than 20 carbon atoms, polyalcohols comprising glycol, glycerol, pentacrythritol, oses having 5 to 12 carbon atoms, aliphatic mono-acids having 12 to 40 carbon atoms, aliphatic polyacids having 2 to 20 carbon atoms, their esters and ethers, aliphatic monoamines having 1 to 6 carbon atoms, aliphatic polyamines having 1 to 6 carbon atoms and at most 4 amine functions, aminoalcohols, and water.

2. The pigmentary printing paste as defined in claim 1 containing no more than 3% by weight of hydrophobic solvent with a boiling point from 100° to 250° C.

3. The pigmentary printing paste as defined in claim 1 wherein the non-ionic surface-active liquid product is the condensation product of propylene oxide containing 0 to 20% of ethylene oxide with propylene glycol.

4. The pigmentary printing paste as defined in claim 1 wherein the non-ionic surface-active liquid product is the condensation product of propylene oxide containing 0 to 10% of ethylene oxide with propylene glycol.

5. The pigmentary printing paste as defined in claim 1 in which the thickening agent is the result of the copolymerization of the unsaturated carboxylic acid or anhydride and of at least one other unsaturated monomer.

6. The pigmentary printing paste as defined in claim 1 in which the alkylene oxide is propylene oxide.

7. The pigmentary printing paste as defined in claim 1 in which the surface-active product results from condensing propylene oxide and n-butanol and has a molecular weight of from 1000 to 5000.

8. The pigmentary printing paste as defined in claim 1 containing in addition to the surface-active product a water-insoluble liquid compound having a fatty character carrying at least one aliphatic radical with at least 8 carbon atoms, and/or a hydrophobic solvent with a boiling point of from 100° to 250° C. in the ratio of from 10 to 30 parts of solvent to 100 parts of additive.

9. The pigmentary printing paste as defined in claim 8 in which the compound having a fatty character comprises 1 to 3 aliphatic radicals carrying no more than 30 carbon atoms and has a boiling point above 180° C.

10. The pigmentary printing paste as defined in claim 8 in which the compound having a fatty character is castor oil, olein or paraffin oil.

11. The pigmentary printing paste as defined in claim 8 in which the hydrophobic solvent is a saturated aliphatic hydrocarbon or a mixture thereof with a boiling point of from 140° to 200° C. containing less than 5% of aromatic hydrocarbons.

12. The pigmentary printing paste as defined in claim 8 in which the compound having a fatty character comprises 20% to 50% by weight of the additive.

13. The pigmentary printing paste as defined in claim 12 in which the compound having a fatty character comprises 30% to 40% by weight of the additive.

14. The pigmentary printing paste as defined in claim 1 in which the unsaturated carboxylic acid is acrylic or methacrylic acid.

15. The pigmentary printing paste as defined in claim 1 in which the compound having at least one atom of active hydrogen is a $C_{13}$-$C_{15}$ oxo alcohol, the additive having a molecular weight of the order of 1000 to 15000.

16. The pigmentary printing paste as defined in claim 1 in which the compound having at least one atom of active hydrogen is castor oil, the additive having molecular weight of 2000 to 3000.

17. The pigmentary printing paste as defined in claim 1 in which the compound having at least one atom of active hydrogen is an ester formed by the reaction of fatty acid, $C_{13}$-$C_{15}$ oxo alcohol and/or polyol, the additive having a molecular weight of 10,000 to 15,000.

18. The pigmentary printing paste as defined in claim 1 containing no more than 1% by weight of the hydrophobic solvent.

19. The pigmentary printing paste as defined in claim 1 containing 0.5% to 15% by weight of the synthetic thickening agent.

20. The pigmentary printing paste as defined in claim 19 containing 1% to 8% by weight of the thickening agent.

21. The pigmentary printing paste as defined in claim 1 in which the synthetic thickening agent is a latex of a water-soluble copolymer whose glass transition temperature is from 20° to 100° C., obtained by polymerising the following elements to form an emulsion:
(a) 40% to 60% by weight of acrylic, methacrylic and/or crotonic acid,
(b) 10% to 30% by weight of a vinyl ester of an organic or mineral acid,
(c) 50% to 30% by weight of at least one ethylene monomer, other then the aforesaid esters, forming a water-insoluble homopolymer,
(d) 0% to 5% by weight of at least one monomer having an ethylene bond and polar groups,
(e) 0% to 5% by weight of at least one monomer having several ethylene bonds, said latex having a rate of dry matter from 30% to 50% and a pH from 2 to 5.

22. The pigmentary printing paste as defined in claim 21 in which the glass transition temperature of the copolymer is from 50° to 100° C.

23. The pigmentary printing paste as defined in claim 21 in which the rate of dry matter of from 35% to 45%.

24. The pigmentary printing paste as defined in claim 1 containing 2% to 10% by weight of additive.

25. The pigmentary printing paste as defined in claim 24 containing 2% to 6% by weight of additive.

26. The pigmentary printing paste as defined in claim 25 containing 3% to 6% by weight of additive.

27. The pigmentary printing paste as defined in claim 1 in which the alkaline agent is ammonia or one or more aliphatic amines or aminoalcohols having 2 to 8 carbon atoms or a mixture thereof.

28. The pigmentary printing paste as defined in claim 1 in which the synthetic thickening agent is a copolymer of ethylene and maleic anhydride.

29. Process for the preparation of the pigmentary printing paste defined in claim 1 wherein an emulsion of the additive is effected in water rendered alkaline in the presence of the emulsifying agent, and then the thickening agent is incorporated in the emulsion and subsequently the other constituents of the printing paste comprising the binding agent and the pigment are added.

30. Process according to claim 29 wherein the other constituents of the printing paste comprise the binding agent, the pigment, a fixing agent, an anti-foaming agent and an agent based on silicone.

* * * * *